United States Patent
Hernandez et al.

(10) Patent No.: US 9,512,869 B2
(45) Date of Patent: Dec. 6, 2016

(54) BOLT SYSTEM

(71) Applicant: Alltrade Tools LLC, Long Beach, CA (US)

(72) Inventors: Hector Ray Hernandez, Fullerton, CA (US); Zhang Jiangfeng, Shanghai (CN)

(73) Assignee: ALLTRADE TOOLS LLC, Long Beach, CA (US)

( * ) Notice: Subject to any disclaimer, the term of this patent is extended or adjusted under 35 U.S.C. 154(b) by 232 days.

(21) Appl. No.: 14/480,952

(22) Filed: Sep. 9, 2014

(65) Prior Publication Data

US 2016/0069374 A1     Mar. 10, 2016

(51) Int. Cl.
*F16B 21/09* (2006.01)
*F16B 33/02* (2006.01)
*F16B 35/04* (2006.01)
*F16B 33/00* (2006.01)

(52) U.S. Cl.
CPC ............. *F16B 33/002* (2013.01); *F16B 21/09* (2013.01); *F16B 35/041* (2013.01); *Y10T 403/581* (2015.01); *Y10T 403/7015* (2015.01)

(58) Field of Classification Search
CPC ......... F16B 21/00; F16B 21/09; F16B 33/002; F16B 33/02; F16B 35/04; F16B 35/041; Y10T 403/58; Y10T 403/581; Y10T 403/7015

USPC ........................................ 403/315, 316, 353
See application file for complete search history.

(56) References Cited

U.S. PATENT DOCUMENTS

| | | | |
|---|---|---|---|
| 770,766 A | 9/1904 | Menchen | |
| 4,065,176 A * | 12/1977 | Fontana | A47C 1/0246 403/353 |
| 4,115,021 A * | 9/1978 | Loch | F16B 21/09 403/353 |
| 5,653,349 A * | 8/1997 | Dana | F16B 12/34 403/353 |
| 5,791,502 A | 8/1998 | Bietz et al. | |
| 6,196,758 B1 | 3/2001 | Scarborough | |
| 6,230,910 B1 | 5/2001 | Olsson et al. | |
| 6,241,109 B1 | 6/2001 | Kautz et al. | |
| 6,352,164 B1 | 3/2002 | Hyatte et al. | |
| 6,595,379 B1 | 7/2003 | Powell | |
| 6,679,393 B1 | 1/2004 | Weaver et al. | |
| 6,685,379 B2 | 2/2004 | Polevoy et al. | |
| 6,802,426 B2 | 10/2004 | Weaver et al. | |

FOREIGN PATENT DOCUMENTS

| | | | | |
|---|---|---|---|---|
| DE | 2715271 A1 * | 10/1977 | ............ | F16B 33/002 |
| DE | 102010044227 A1 * | 3/2012 | ............ | F16B 33/002 |

\* cited by examiner

*Primary Examiner* — Josh Skroupa
(74) *Attorney, Agent, or Firm* — David J. Pitman; Fulwider Patton LLP

(57) ABSTRACT

A bolt system for attaching workpieces together, in situations where access is denied at the distal surface of a distal workpiece.

2 Claims, 4 Drawing Sheets

BOLT SYSTEM

BACKGROUND

The present invention relates to the field of tensioning screws bolts. Specifically, the invention is directed to an improved bolt system for connecting laminar workpieces together in situations where access is denied to the region distal of the distal workpiece.

Screws and bolts are known in the art. However, most screws are simply configured to penetrate through workpieces of material when it is desired to connect the workpieces together. Furthermore, bolts are typically used to connect two workpieces which define circular holes. The bolt is inserted through both holes, and a threaded nut is applied to the distal end of the bolt. The nut is tightened by rotation about the bolt threads, and the workpieces are drawn together by the bolt head and the nut.

However, problems arise in the art. For example, in some instances, there is no access to the rear or distal side of the distal workpiece, so the workman is unable to apply a nut to the distal end of a bolt. This situation may arise when the distal workpiece is attached to a wall or other enclosed structure. Alternatively, the distal workpiece may be enclosed by a cylinder or railing or like structure, so that the workman cannot gain access to the distal side of the distal workpiece.

Thus, there is a need for a bolt system that addresses problems in the prior art. The present invention addresses these, and other needs.

SUMMARY OF THE INVENTION

In some embodiments, the invention is a bolt system comprising a distal workpiece having a keyhole opening that includes a circular portion with a first diameter and a slotted portion with a first width, wherein the first width is smaller than the first diameter. A tube is provided having a second diameter and a proximal end and a distal end, the tube defining an internal threaded bore. A rod is provided having a proximal end and a distal end, and having a third diameter sized to pass proximally into the distal end of the bore and distally through the first diameter of the keyhole circular portion but sized too large to pass axially through the first width of the slotted portion, the rod further defining external threads configured to matingly engage with the internal threaded bore so that rotation of the rod in relation to the tube causes the rod to advance alternatively retract within the bore of the tube. Under this configuration, the rod has two segments removed from sides of the rod, thereby configuring the rod to define two axial surfaces that each extend parallel with each other and with an elongate axis of the rod, the two axial surfaces being separated by a second width that is smaller than the first width whereby the two axial surfaces may slide, perpendicularly to an elongate axis of the rod, into and along the slotted portion of the keyhole opening, but wherein the third diameter of the rod is sufficiently large in relation to the first width of the slotted portion that the rod cannot be rotated within the slotted portion when the axial planes are within the slotted portion. Furthermore a circular cylindrical portion of the rod is located distal of the two axial surfaces, the circular cylindrical portion having the third diameter that is too large to pass axially through the first width of the slotted portion of the keyhole, whereby the rod may not be axially withdrawn from the keyhole when the axial surfaces are within the slotted portion.

In some embodiments, the system further includes a proximal workpiece that defines an aperture having a fourth diameter, the fourth diameter being greater than the third diameter but smaller than the second diameter, whereby the rod is passable through both the opening and the circular portion of the keyhole, and further whereby the tube abuts against the proximal workpiece without passing through the aperture.

Thus, the bolt system of the invention creates a novel and useful system for joining workpieces together in difficult situations. These and other advantages will become apparent when the invention is read in conjunction with the figures and the detailed description of some embodiments.

DETAILED DESCRIPTION OF SOME EMBODIMENTS

Figure 1:
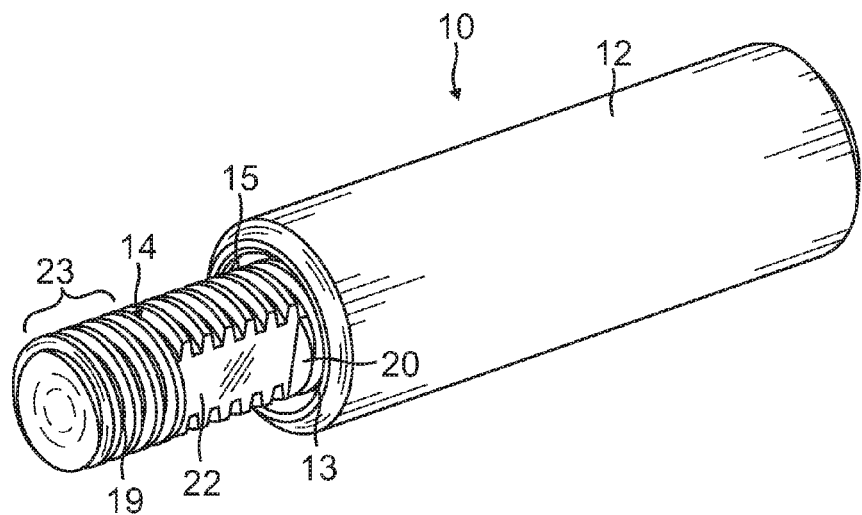
FIG. 1 is a perspective view of the bolt system of the present invention, seen from a first angle, and seen in an assembled condition.
Figure 2:
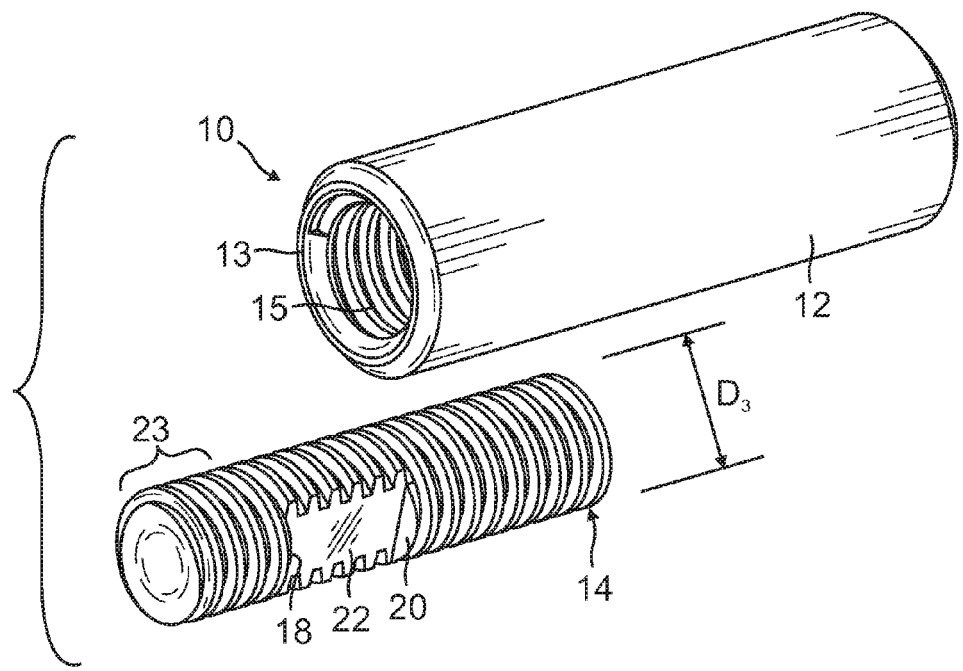
FIG. 2 is a perspective view of the bolt system of the present invention, seen from one angle, and seen in an unassembled condition.
Figure 3:
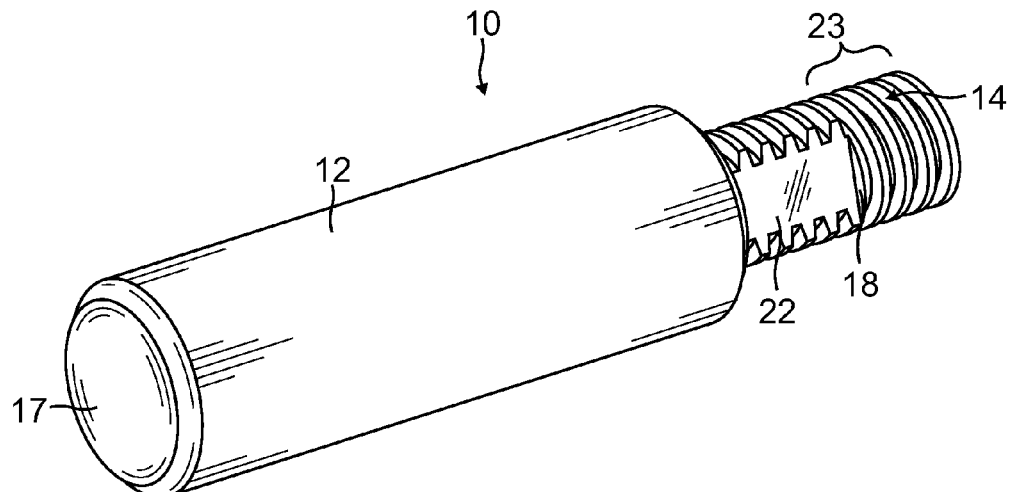
FIG. 3 is a perspective view of the bolt system of the present invention, seen from a second angle, and seen in an assembled condition.

The present invention is described in combination with the drawings, where like numerals identify like elements. In some embodiments, and as best understood in conjunction with the figures, the invention is a bolt system for attaching a first workpiece to a second workpiece.

The terms "proximal" and "distal" are used in the sense that "proximal" is an end or direction closer to a workman who is handling an element, and distal is an end or direction that is further from the workman when handling the element. This is exemplified in FIG. 6.

With reference to FIGS. 1-4, the bolt system includes a snagging device 10, which in turn comprises a tube 12 having an outside diameter D2 (FIG. 4) and which defines an internal threaded bore 15. In some embodiments, the internal threaded bore is not continuous throughout the length of the tube, but terminates in a proximal end 17 which may be fabricated by simply terminating the drilling action that forms the threaded bore before the drill punches through the proximal end 17 of the tube. The tube terminates in an opposite distal face 13 at which the bore enters the tube.

The snagging system 10 further comprises a rod 12 that has an external diameter D3 (FIG. 4), and which defines external threads 19. The external threads on the rod are configured to threadably mate with the internal threaded bore 15, so that rotation of the tube when the rod is held in the bore causes the rod to advance or retract along the bore.

Figure 4:
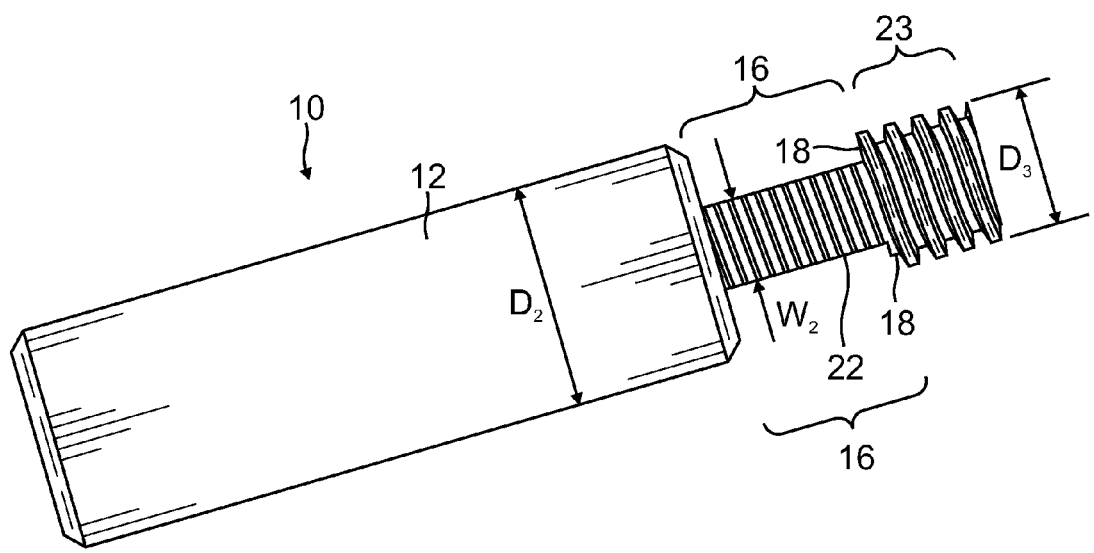
FIG. 4 is the view of the bolt system in FIG. 3, but rotated about an axis to show different details.

The rod 14 is modified from its otherwise purely cylindrical shape by machining, or otherwise cutting, opposing segments 16 (indicated in FIG. 4) of the circular shape off the rod. When the segments 16 are removed, an end portion 23 of the rod (FIG. 4) is left at the distal end of the rod that retains the full circular cylindrical shape of the rod. Preferably, the two segments 16 are in opposing arrangement, so that both segments have parallel faces that extend along the length of the rod. Thus, once the segments 16 have been cut from the rod, each segment is defined by a distal face 18 that faces towards the proximal end of the rod, and a proximal face 20, that faces towards the distal end of the rod. (See FIG. 6.) Between each proximal face and distal face extends an axial face 22 that occupies a plane extending parallel with the elongate axis of the rod. The axial faces are separated by a width W2 (FIG. 4). The configuration described may be readily understood with reference to FIGS. 1-4.

Figure 5:
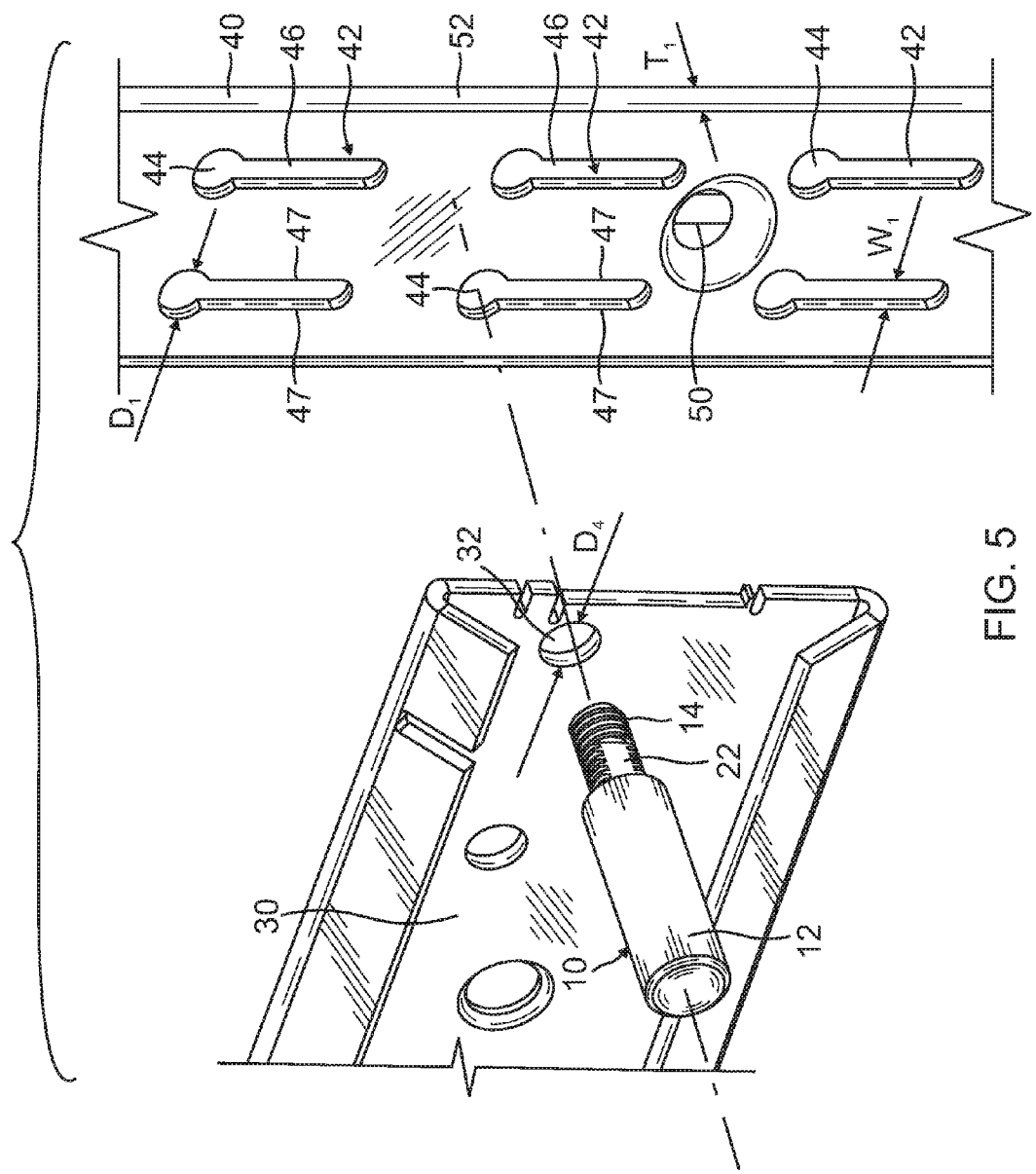
FIG. 5 is a schematic perspective view showing the bolt system of the present invention in the process of being used.

Turning now to the workpieces that are to be connected together, FIG. 5 exemplifies a proximal workpiece 30 and a distal workpiece 40 that may be used in conjunction with the snagging device 10.

The proximal workpiece 30 may be any type of workpiece configured for connection to another workpiece. For example, it may be a rail (as shown in FIG. 5) but equally it may be a flat sheet, or a rectangular rod, or the like. A circular hole 32 having diameter D4 (FIG. 5) is pre-drilled into the proximal workpiece 30 and is sized for receiving the rod 14 with its smaller diameter D3.

The distal workpiece 40 may also take on any form, just as the proximal workpiece 30. However, the distal workpiece has a "keyhole" opening 42 cut into it. The keyhole opening comprises a circular eye section 44 having a diameter D1 (FIG. 5) which is sized for receiving the rod 14 with its smaller diameter D3, and a vertically extending slot section 46, defined by parallel linear sides 47 which are separated by a width W1 (FIG. 5). The width W1 of the slot section is smaller than the diameter D1 of the eye section, and is selected so that the axial faces 22 of the rod (separated by width W2) may easily slide between the linear sides 47. Typically, the distal workpiece 40 may be attached to a fixed object such as a wall by a support screw 50. Also, typically, the distal workpiece may be spaced by a spacing element 52 (see FIG. 5) having a depth T1 that is larger than the depth T2 (FIG. 6) of the keyhole opening 42. The spacing element may be an integral portion of the distal workpiece, or it may be inserted as a separate element. The spacing element has the effect of spacing the distal workpiece away from a wall or other object to which screw 50 fixes the workpiece. This creates a space behind the distal workpiece to receive the distal portion 23 of the rod despite the fact that the distal workpiece is fixed to a stable object. In the prior art, once a workpiece is fixed to a stable object, and despite the possibility that spacing may be present, there may still be no access behind the distal workpiece for a workman to insert his hand to affix a nut on a bolt or rod that may be inserted through both workpieces. However, the present invention is designed to overcome this disadvantage in the prior art.

Thus, in use of the bolt system of the present invention, the distal workpiece 40 with its keyhole opening 42 is lined up with the proximal workpiece, with its circular hole 32, as seen in FIG. 5. More specifically, the circular hole 32 is lined up with the eye section 44. At this point, the workman takes a snagging device 10 in the assembled condition (e.g. FIGS. 1,3, 4) and moves the rod 14 distally first through the circular hole 32 of the proximal workpiece and then through the eye section 44 of the distal workpiece. The workman rotates the snagging device 10 (including the rod) until he feels, by tactile response, that the axial faces 22 of the rod are aligned with the linear sides 47 of the slot section. He then gently allows the weight of the proximal workpiece 30 to cause the rod 14 to slide down into the slot section 46.

Figure 6:
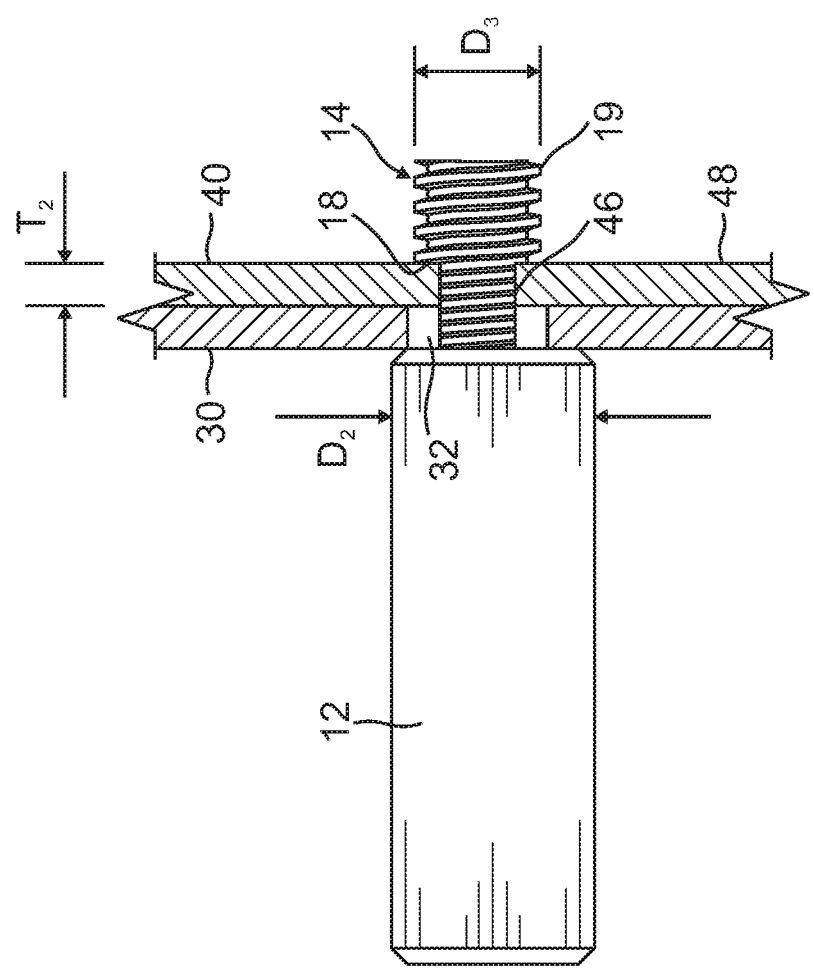
FIG. 6 is a partial sectional view of the bolt system of the present invention, applied to join two workpieces together. The bolt system is seen in perspective but workpieces that are connected to each other are shown in section.

It will be appreciated that at this point, the rod 14 cannot be axially withdrawn from the keyhole 42 because the distal faces 18 that define the segments 16 bear up against the distal surface 48 of the distal workpiece 40, as seen in FIG. 6 which is a top down sectional view through the two workpieces at a point of connection by the snagging device (snagging device shown in plan). The workman then rotates the tube 12, which causes the rod 14 (which is held against rotation by the slot section 46) to be retracted into the threaded bore 15. This action causes the distal face 13 of the tube 12 to move towards the distal face 18 of the rod, thereby pinching the two workpieces 30, 40 between them into a securely fastened relationship. FIG. 6. The tube 12 may be tightened to be finger tight, and to enhance the grip the tube may be knurled in known fashion. A novel and useful connection system is achieved.

Removal of the snagging device 10 may follow the same procedure in reverse, which will permit separation of the workpieces.

Thus, the present invention describes a novel and useful system and method for attaching a proximal workpiece to a distal workpiece that may already be attached to a fixed object in a manner that denies access to the rear or distal side of the distal workpiece for placement of a nut. The present system does not require a nut at all, and allows workpieces to be connected in awkward conditions.

It will be apparent to those skilled in the art that various changes and modifications may be made thereto without departing from the invention. It is intended in the appended claims to cover all such changes and modifications that fall within the true spirit and scope of the invention.

I claim:

1. A bolt system comprising:
    a distal workpiece having a keyhole opening that includes
        a circular portion with a first diameter and a slotted portion with a first width, wherein the first width is smaller than the first diameter;
    a tube having a second diameter and a proximal end and a distal end, the tube defining an internal threaded bore;
    a rod having a proximal end and a distal end, and having
        a third diameter sized to pass proximally into the distal end of the bore and distally through the first diameter of the keyhole circular portion but sized too large to pass axially through the first width of the slotted portion, the rod further defining external threads configured to matingly engage with the internal threaded bore so that rotation of the rod in relation to the tube causes the rod to advance alternatively retract within the bore of the tube;
    wherein, the rod has two segments removed from sides of the rod, thereby configuring the rod to define:
        two axial surfaces that each extend parallel with each other and with an elongate axis of the rod, the two axial surfaces being separated by a second width that is smaller than the first width whereby the two axial surfaces may slide, perpendicularly to an elongate axis of the rod, into and along the slotted portion of the keyhole opening, but wherein the third diameter of the rod is sufficiently large in relation to the first width of the slotted portion that the rod cannot be rotated within the slotted portion when the axial planes are within the slotted portion; and
        a circular cylindrical portion of the rod located distal of the two axial surfaces, the circular cylindrical portion having the third diameter that is too large to pass axially through the first width of the slotted portion of the keyhole, whereby the rod may not be axially withdrawn from the keyhole when the axial surfaces are within the slotted portion.

2. The bolt system of claim 1, further including a proximal workpiece that defines an aperture having a fourth diameter, the fourth diameter being greater than the third diameter but smaller than the second diameter, whereby the rod is passable through both the opening and the circular portion of the keyhole, and further whereby the tube abuts against the proximal workpiece without passing through the aperture.

* * * * *